United States Patent
Borikar et al.

(10) Patent No.: US 10,785,161 B2
(45) Date of Patent: Sep. 22, 2020

(54) AUTOMATIC RATE LIMITING BASED ON EXPLICIT NETWORK CONGESTION NOTIFICATION IN SMART NETWORK INTERFACE CARD

(71) Applicant: Cisco Technology, Inc., San Jose, CA (US)

(72) Inventors: Sagar Borikar, San Jose, CA (US); John William Marshall, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/031,127

(22) Filed: Jul. 10, 2018

(65) Prior Publication Data
US 2020/0021532 A1     Jan. 16, 2020

(51) Int. Cl.
  *H04L 12/841* (2013.01)
  *H04L 12/801* (2013.01)
  *H04L 29/06* (2006.01)
  *H04L 12/861* (2013.01)

(52) U.S. Cl.
  CPC ............ *H04L 47/28* (2013.01); *H04L 47/11* (2013.01); *H04L 49/90* (2013.01); *H04L 69/22* (2013.01)

(58) Field of Classification Search
  None
  See application file for complete search history.

(56) References Cited

U.S. PATENT DOCUMENTS

| | | | |
|---|---|---|---|
| 7,961,621 B2 | 6/2011 | Bergamasco et al. | |
| 8,407,364 B2 | 3/2013 | Prabhakar et al. | |
| 9,065,795 B2 | 6/2015 | Prabhakar et al. | |
| 9,391,840 B2 * | 7/2016 | Pope | H04L 47/286 |
| 9,419,900 B2 | 8/2016 | Anghel et al. | |
| 9,444,754 B1 | 9/2016 | Noureddine | |
| 9,614,765 B2 | 4/2017 | Calavrezo et al. | |
| 9,674,090 B2 | 6/2017 | Caulfield et al. | |

(Continued)

OTHER PUBLICATIONS

Kabbani, et al., "AF-QCN: Approximate Fairness with Quantized Congestion Notification for Multi-tenanted Data Centers", 2010 IEEE 18th Annual Symposium on High Performance Interconnects, Aug. 2010, 8 pages.

(Continued)

*Primary Examiner* — Xavier S Wong
(74) *Attorney, Agent, or Firm* — Edell, Shapiro & Finnan, LLC (57) ABSTRACT

A method is provided by which a network adapter device receives a packet sent over a network from a peer, the packet including an enqueue timestamp indicating when the packet has been enqueued at the network adapter device. The network adapter device parses a header of the packet to detect whether the header includes bits indicating that the peer device is experiencing congestion, and obtains packet metadata of the packet and the enqueue timestamp of the packet. The network adapter device compares the packet metadata with information in a flow table to identify an entry in the flow table corresponding to a flow to which the packet metadata matches. The network adapter device sets a timer associated with the flow, the timer for use in scheduling transmission of a next packet provided by the host to be sent to the peer.

20 Claims, 7 Drawing Sheets

(56) References Cited

U.S. PATENT DOCUMENTS

| | | | | |
|---|---|---|---|---|
| 9,680,760 | B2 | 6/2017 | Lai et al. | |
| 9,959,143 | B1* | 5/2018 | Anderson | G06F 9/544 |
| 10,230,810 | B1* | 3/2019 | Bhide | H04L 67/2842 |
| 2002/0186657 | A1* | 12/2002 | Jain | H04L 47/10 370/235 |
| 2010/0211612 | A1* | 8/2010 | Afaneh | G11B 27/034 707/803 |
| 2013/0003538 | A1* | 1/2013 | Greenberg | H04L 47/623 370/230 |
| 2015/0037291 | A1 | 2/2015 | Stephenne et al. | |
| 2015/0163142 | A1 | 6/2015 | Pettit et al. | |
| 2015/0163144 | A1 | 6/2015 | Koponen et al. | |
| 2016/0380896 | A1* | 12/2016 | Caulfield | H04L 47/12 370/235 |
| 2016/0381189 | A1* | 12/2016 | Caulfield | H04L 49/25 370/389 |
| 2017/0092236 | A1* | 3/2017 | Tripathi | G09G 5/395 |

OTHER PUBLICATIONS

Zhu, et al., "Congestion Control for Large-Scale RDMA Deployments," SIGCOMM '15, Aug. 2015, 14 pages.
Mellanox, "Understanding RoCEv2 Congestion Management," Version 17, https://community.mellanox.com/docs/DOC-2321, Oct. 2015, 11 pages.
Ramakrishnan, et al., "The Addition of Explicit Congestion Notification (ECN) to IP," Network Working Group, Request for Comments: 3168, Sep. 2001, 64 pages.
Noormohammadpour, et al., "Datacenter Traffic Control: Understanding Techniques and Trade-Offs," IEEE Communications Surveys & Tutorials, vol. 20, Issue 2, Dec. 2017, 34 pages.
Hewlett Packard Enterprise Development LP., "HPE 5900 Switch Series", 4AA3-8996ENW, Feb. 2017, Rev. 9, 16 pages.
Dell Technologies, "Dell Networking OS Configuration Guide for the Z9100—ON System 9.10(0.0)", downloaded Apr. 29, 2020, 3 pages.
Lenovo, "Release Notes for Lenovo Cloud Network Operating System 10.7", Lenovo ThinkSystem NE10032, First Edition, Mar. 2018, 12 pages.
Patton, Diane, "Converge your network with explicit congestion notification", https://cumulusnetworks.com/blog/explicit-congestion-notification/ , Apr. 8, 2017, 9 pages.
Mellanox Tehcnologies, "HowTo Configure ECN on Mellanox Ethernet Switches (Spectrum)", https://community.mellanox.com/s/article/howto-configure-ecn-on-mellanox-ethernet-switches-spectrum-x, Dec. 3, 2018, 4 pages.

* cited by examiner

AUTOMATIC RATE LIMITING BASED ON EXPLICIT NETWORK CONGESTION NOTIFICATION IN SMART NETWORK INTERFACE CARD

TECHNICAL FIELD

The present disclosure relates to network congestion management.

BACKGROUND

Explicit Congestion Notification (ECN) is a method by which the end-to-end software services/devices can notify a network congestion state without dropping a packet. Transmission Control Protocol/Internet Protocol (TCP/IP) packet drop causes retransmission delay that essentially introduces latency which is detrimental for low latency, high throughput applications in a cloud environment and other environments, such as financial institutions. Every retransmission is very time consuming and can cause an application to reduce the responsiveness to the congestion.

Usually ECN is enabled on best effort Quality of Service (QoS) policies, as for no drop policies, priority flow control is enabled by traditional switches. In order to support ECN, the end-to-end devices along with the entire network path need to support ECN as per IETF RFC 3168.

Congestion implementation inside a virtual machine (VM) in a scaled environment can be central processor unit (CPU) intensive because there are a large number of VMs for which there may be a need to determine which flow is causing congestion and how long it needs to wait. As network interface card (NIC)/network adapter devices act as a pass-through for the ECN, the host ecosystem, specifically the network stack, needs to implement ECN. Not all network stacks/custom applications are ECN-aware and this is a challenge for low latency applications. Current ECN implementations do not give or offload any flexibility to the network adapter device to support the ECN and make the host ecosystem completely oblivious to the ECN implementation.

DESCRIPTION OF EXAMPLE EMBODIMENTS

Overview

In one embodiment, a method is provided that is performed by a network adapter device connected to a host. The method includes the network adapter device receiving a packet sent over a network from a peer, the packet including an enqueue timestamp indicating when the packet has been enqueued at the network adapter device. The network adapter device parses a header of the packet to detect whether the header includes bits indicating that the peer device is experiencing congestion, and obtains packet metadata of the packet and the enqueue timestamp of the packet. The network adapter device compares the packet metadata with information in a flow table to identify an entry in the flow table corresponding to a flow to which the packet metadata matches. The network adapter device sets a timer associated with the flow, the timer for use in scheduling transmission of a next packet provided by the host to be sent to the peer. Upon expiration of the timer, the network adapter device triggers a function of the network adapter device to manage transmission of the next packet for the flow by the network adapter device.

Example Embodiments

Presented herein is a mechanism to offload Explicit Congestion Notification (ECN) per flow to so-called "smart" network interface cards (NICs) and thereby remove the dependency of the end-to-end ECN compatibility to the host software ecosystem. The technology is trending to a situation in which the host ecosystem is catered to a specific application, expecting the full-fledged ECN implementation will push the host software ecosystem to the edge.

ECN Briefly

ECN involves communicating whether (or not) the endpoints or the switches in the path are experiencing congestion. Each device capable of ECN in the path has a weighted random early detection (WRED) drop profile per queue that determines whether to generate the ECN notification to the peer or not. The WRED drop profile configuration is user driven and device characteristics dependent. Once the queue (mostly per flow) fills up to the level of the WRED drop profile, the device modifies the IP header to add the ECN fields in the Differentiated Services field.

The Differentiated Services field has two bits for ECN notification status and six Differentiated Service Code Point bits. Depending upon the status of two ECN bits, the peer device understands whether the ECN needs to be enforced or not.

| ECN Bits | Interpretation |
|---|---|
| 00 | ECN is not possible |
| 01 | ECT(1) ECN capable |
| 10 | ECT(0) ECN capable |
| 11 | Congestion Experienced |

When the WRED drop profile watermark is reached as per the configuration, the switch sets the ECN bits to "11" to indicate that congestion is detected by the switch. The peer devices, when parsing the Differentiated Services field, detect that congestion is experienced by the peer device. Upon detection, the device reduces the transmission field and hence it does not send further packets to the switch, causing network delay without any packet drop. This mechanism avoids retransmission of packets, thereby resulting in better effective utilization of the network bandwidth than would occur with packet drops and packet retransmission.

Figure 1:
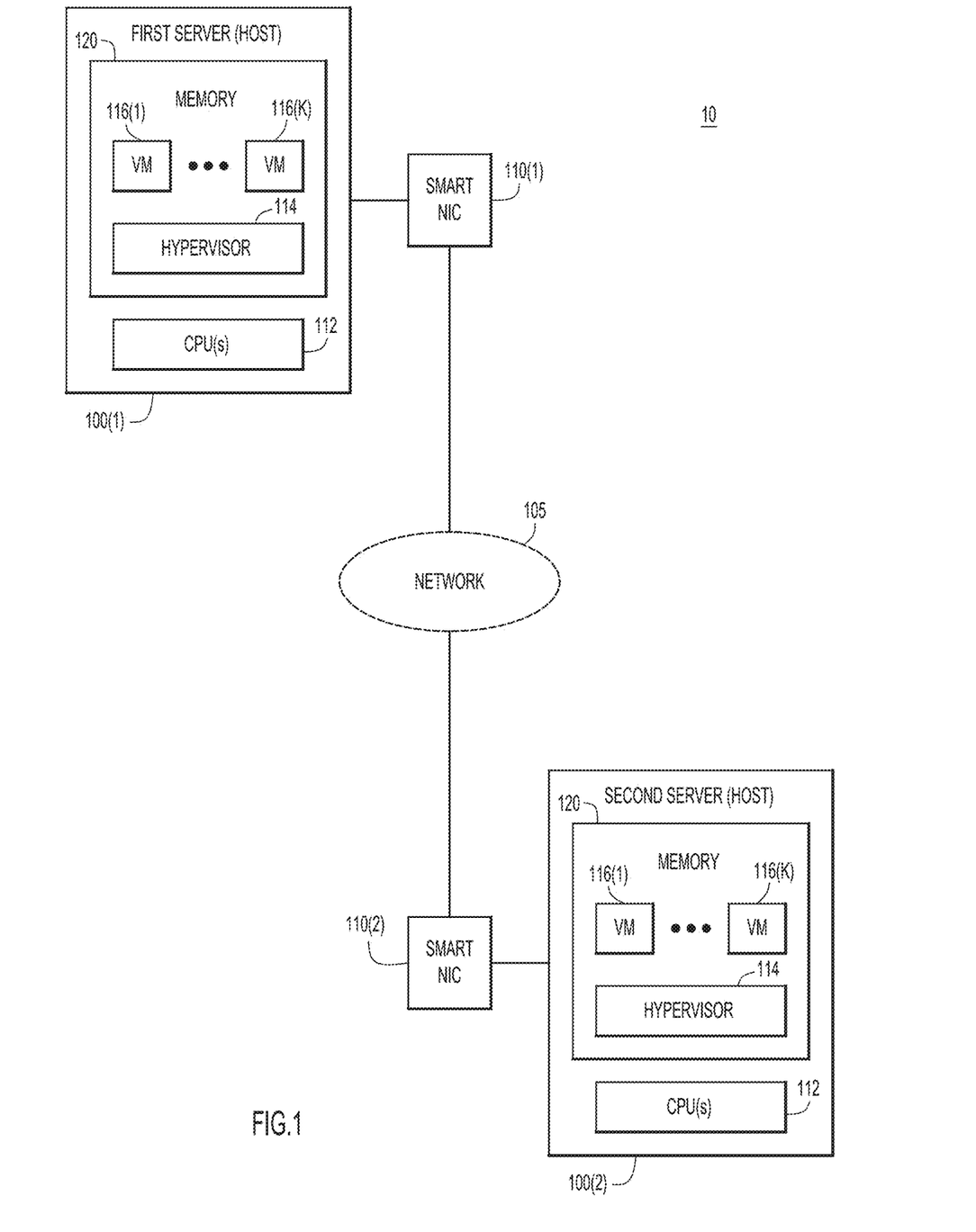
FIG. 1 is a block diagram of a communication environment in which at least two hosts communicate with each other via an associated smart network interface card/network adapter device configured to handle congestion detection and management, according to an example embodiment.

With smart network interface cards (NICs), ECN can be handled at the network adapter device level without passing the ECN notifications to the host and requiring the host to act on the ECN. Reference is now made to FIG. 1. FIG. 1 shows a communication environment 10 that includes at least two servers (hosts) 100(1) and 100(2) in communication with each other via network 105. There is at least one smart NIC associated with each of the servers. Specifically, there is a smart NIC 110(1) associated with server 100(1) and smart NIC 110(2) associated with NIC 100(2). There may be intervening network elements in network 105, and those intervening network elements may also participate in ECN related operations.

The servers 100(1) and 100(2) may take on a variety of forms and configurations. In one form, each server 100(1) and 100(2) includes one or more central processing units (CPUs) 112, a hypervisor 114 and a plurality of virtual machines (VMs) 116(1)-116(K) running on top of the hypervisor 114. The hypervisor 114 and VMs 116(1)-116(K) may be embodied by software instructions stored in a memory 120, and which instructions are executed by the CPU(s) 112. As described herein, the smart NICs 110(1) and 110(2) are configured to perform network congestion notifications and rate adjustments.

It is further envisioned that the functions of the smart NIC described herein may be embodied/implemented by software instructions stored in memory 120 and executed by the CPU(s) 112 of a host. The memory 120 may include or take the form of read only memory (ROM), random access memory (RAM), magnetic disk storage media devices, optical storage media devices, flash memory devices, electrical, optical, or other physical/tangible memory storage devices. Thus, in general, the memory 120 may comprise one or more tangible (non-transitory) computer readable storage media (e.g., a memory device) encoded with software comprising computer executable instructions and when the software is executed (by the CPU(s)) it is operable to perform the operations described herein.

In a fully loaded hypervisor environment in which multiple VMs are active and issuing direct transfer of the network packets from the VM to the network device using, for example, the Single-Root Input/Output virtualization (SR-IOV) mechanism, the scale achieved is in the magnitudes of 128 to 256 devices. Typically, Transmission Control Protocol (TCP) traffic is a flow inside a given VM. This means there can be as many as 256 TCP flows active at the same time, and some or all of these flows are expecting low latency high-throughput, even in bursty network scenario. Smart NICs can add match action filters for differentiated services per flow and add flow table entries for each category of ECN bit combinations, such as ECN capable and congestion present notifications. When the match action filters detect congestion, present behavior transmitted by the peer switch device, the flow entry is marked to indicate that congestion is detected on the flow.

A transmit path for a given flow includes the fetching of the descriptors and data buffers from the memory of the host (server), whether bare metal or VM (SR-IOV), depending upon different scheduling algorithms, such as the Deficit Weighted Round Robin (DWRR) protocol. When the flow for a given logical interface is marked as congestion enabled, the smart NIC can reduce the weight of flow by a predetermined magnitude to reduce the buffer fetch on behalf of the flow from the host memory. In the transmit path, packets are not dropped by the smart NIC at any cost as it is completely the adapter's prerogative when to fetch the packet descriptors and buffers from the host memory. With sufficient weights given to the logical interface for scheduling the packets, the smart NIC can essentially determine when to fetch the packet. The smart NIC can also associate a timer with a given logical interface in order to reduce the transmission rate from the host. Thus, the host does not need to be aware of the ECN in order to achieve the congestion reduction without packet drops. The smart NIC presented herein may be based on rate-based signaling, and the rate versus weight may be configured by policy and have different behaviors.

Congestion Management Enabled Network Adapter (NIC)

ECN is a quality of service function implemented at the IP and transport protocol to ensure that packets are not dropped even though there is congestion on the channel. It is generally implemented as a Type of Service that is represented by an 8-bit field in the IP header.

Type of Service (ToS) is characterized/represented by the following fields in the IP Header:

| CS | CS | CS | AF | AF | ECN | ECN |
|----|----|----|----|----|-----|-----|

CS = Class selector
AF = Assured Forwarding
ECN = Explicit Congestion Notification CS is 3-bit field representing 8 different types of QoS characteristics and each one of them can have ECN compatibility represented in the table above.

There is a protocol between ECN compatible devices to negotiate the capabilities and exchange the congestion information.

For each interface queue through which the packets are flowing, there are certain rules defined as per the ECN protocol. Each queue is mapped to the port that has set the QoS buffers depending upon the user configuration. The number of buffers determine the packet forwarding/storing capabilities in the event that the peer is either slow or fast compared to its own speed. For each QoS, the minimum and maximum buffer threshold is configured.

If the number of packets are less than the minimum threshold of the buffers available at any given time, ECN fields are kept empty and the packets are transmitted as is. The ECN decision may be made based on the WRED protocol.

If the number of packets are greater than a configured minimum threshold, then the following actions may be taken:

1. If the negotiating endpoints are ECN capable, and the algorithm's result indicates a packet drop, then the IP header's ECN field is marked as 11, indicating Congestion Experienced, but the packet is sent through. Inherently the packet is not dropped.

2. If the endpoints are not ECN capable, then the packet is dropped based on the AF fields in the IP header.

3. If the ECN field is already set to 11 by the peer who sent it, the packet is forwarded as it is without modifying the IP header.

When the endpoint receives the packet with the ECN field set as 11, it understands that one of the hops in the path is experiencing congestion. Therefore, the endpoint does not schedule the packet to transmit on the wire. Thus, it automatically controls the flow of the traffic without causing the packet to be dropped.

Normally, a networking stack which is compatible with ECN, such as TCP, will have an implementation of ECN determined during the connection establishment procedure. The ECN capabilities are exchanged with the peer using several flags such as ECN Echo (ECE), Congestion Window Reduced (CWR) and Nonce Sum (NS) flags. When the TCP stack receives the packet with ECN field set as 11 indicating Congestion Experienced on the wire, it acknowledges the congestion using the ECE flag. It reduces the congestion window and acknowledges the congestion with another flag. Thus, overall traffic for a given TCP flow is controlled without dropping the packet.

To enable this feature, all the hops along with the endpoints need to support the ECN capability in hardware/software. Generally, WRED is used by all the hops to detect and notify the congestion in the hop devices while transmitting the packets. This avoids the congestion and manages the queues more effectively.

Figure 2:
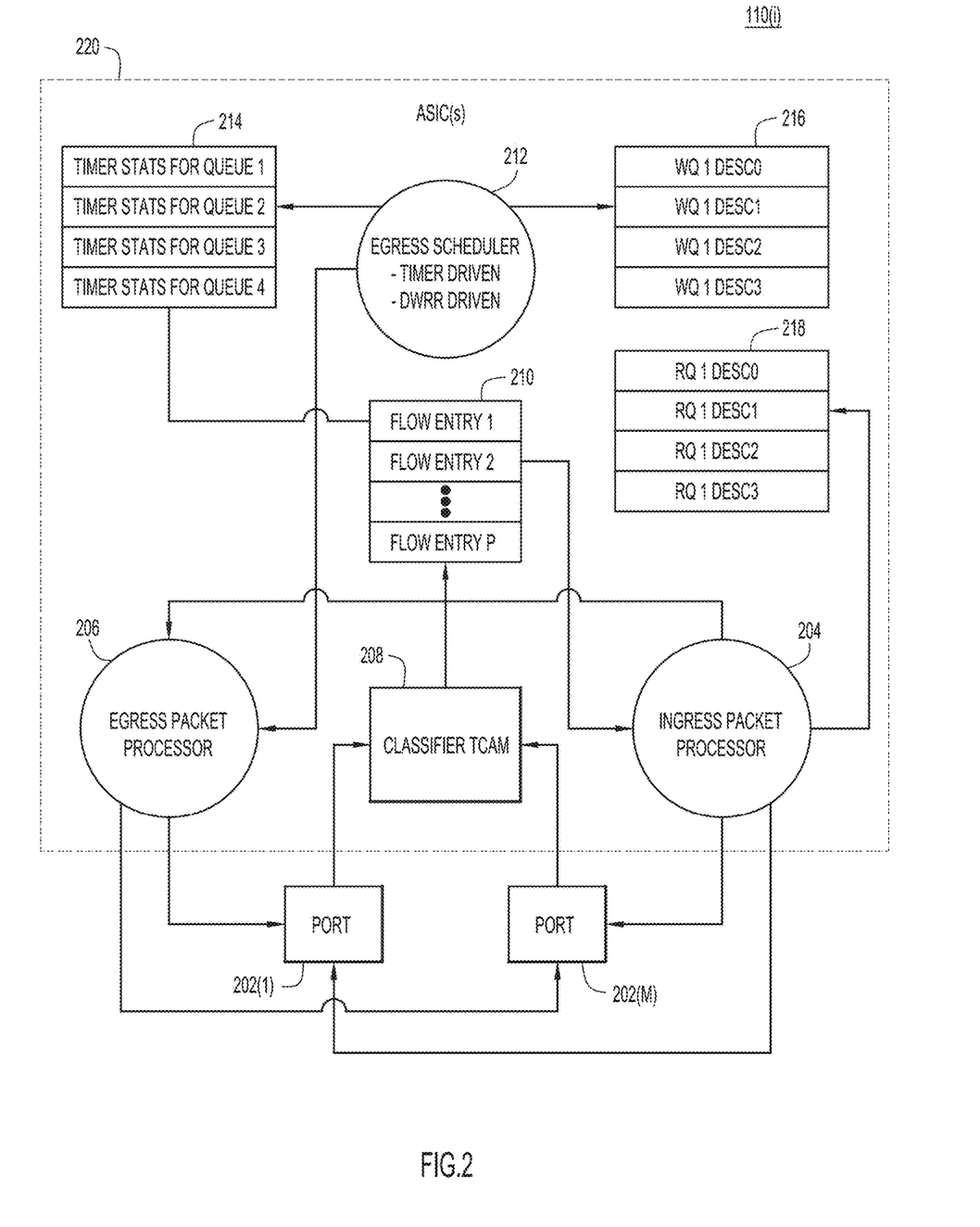
FIG. 2 is a block diagram of relevant components of a network interface card configured to handle congestion detection and management, according to an example embodiment.

Reference is now made to FIG. 2. FIG. 2 shows a block diagram of the components of a smart NIC, generically identified by reference numeral 110(i), configured to perform the congestion detection and management techniques presented herein. The smart NIC includes a plurality of ports 202(1)-202(M) at which packets may be received (uplink) or from which packets at the may be transmitted. There is an ingress packet processor 204 and an egress packet processor 206 each connected to the ports 202(1)-202(M). A classifier Ternary Content Address Memory (TCAM) 208 is connected to each of the ports 202(1)-202(M) as well.

The smart NIC further includes a flow table 210. The flow table 210 stores data associated with one or more packet flows (1-P) managed by the smart NIC. The flow table 210 is connected to the ingress packet processor 204 and to the classifier TCAM 208.

An egress scheduler 212 is included. The egress scheduler 212 is coupled to a block of timer statistics (stats) TCAMs 214 to store timer statistics (stats) for a plurality of queues/buffers. In one example, there are four such queues/buffers. There are a plurality of write queue (WQ) memory locations/buffers 216 for storing packet descriptors of packets to be transmitted from the NIC, and a plurality of read queue (RQ) memory locations/buffers 218 for storing packet descriptors of packets that were received by the smart NIC and to be read by the host.

Many, and in some cases all, of the blocks shown in FIG. 2 of the smart NIC 110(i) may be implemented in one or more Application Specific Integrated Circuits (ASICs) as shown by the dotted box at reference numeral 220.

The smart NIC sets up flow table entries that the classifier TCAM 208 uses to parse the L3/L4 packet headers and identify the packet fields. These fields are defined as a packet information header. The packet information header contains the metadata associated with the packet that is used as a data structure that can be forwarded with the packet to the ingress packet processor 204 or egress packet processor 206, inside the smart NIC. The packet processors 204 and 206 are small packet processors, each of which has a defined set of instructions to perform arithmetic and field insertion/removal operations on the packet header and payload. The firmware sets up filter entries to identify the TCP packet flows and to parse the TCP/IP header fields, from which the ECN byte field as described above is evaluated.

At the time of connection establishment, when the classifier TCAM 208 parses the packet, it identifies the flow and records it with the connection identifier (ID) per virtual network interface (vnic) in the flow table 210.

The NIC firmware configures the buffers/queues 216 and 218 with a minimum threshold and a maximum threshold for each flow. These thresholds are used for making a scheduling decision. The thresholds are set per flow table entry as a part of metadata associated with every flow entry. The metadata also includes the timestamps and a configurable timer. The packet processor 204 and/or 206 provides the timer facility for the TCP flows.

When the classifier TCAM 208 detects that the ECN bits are set for a given flow index, the ingress packet processor 204 program will be triggered to parse the complete ECN byte from the IP header of the packet. Using the ECN byte, the ingress packet processor 204 will identify what type of operation is requested by the peer, and takes appropriate action as described below. If the peer is reporting congestion by setting the Congestion Experienced (CE) bits in the ECN field of the IP header, then the ingress packet processor sets up the timer by adjusting the window for the congestion scale. The timer value is set based on a time-based congestion window algorithm, for example. However, this algorithm is configurable and can be determined based on ASIC design of the smart NIC. The timer expiry action is decided as a program pointer which will be passed to the flow index as an input parameter to the egress scheduler 212. Until the timer expires, no further packets will be sent from the NIC. The corresponding flow is marked as ineligible for scheduling if the host application posts the work for that TCP flow. It may be ensured that the depth of the packet buffer on both the transmit side and receive side is set to the maximum capacity (such as 8k, for example) so that it can accommodate a larger number of packets posted by the host, and so that the typical network transmit watchdog timer in the host application stack will not expire. Thus, the NIC ensures that the traffic is throttled at the ASIC level of the NIC by controlling the scheduling activity of the traffic flow in the ASIC portion of the NIC. This handling is specifically done when the receiver (peer) is slower than the host which is posting the TCP packets to the smart NIC.

On the other hand, if the host application is very slow in processing TCP packets in the peer such that the NIC needs to set the ECN bits in the IP header, it is necessary to maintain the receive descriptors at a minimum gap between the posted descriptors versus processed descriptors by the NIC. The gap is the difference between posted buffers and processed buffers by the host driver. The drive usually keeps track of the currently posted index and the processed index. This means that while the NIC is posting the packets in the host memory, the NIC is always keeping track of the difference between the posted index and the fetch index for the receive descriptors. The NIC firmware defines the range for defining the ECN for a given flow dependent on the number of buffers carved out for that QoS and how many flows are sharing the same QoS. The range is configurable and user or the NIC firmware can determine that range appropriately either dynamically or at the NIC configuration time.

Once the NIC detects that the flow needs to be throttled due to weak host CPU processing, it isolates the flow ID and marks the flow with the ECN field. When the next packet is sent by the host application, the NIC sets the ECN field with "Congestion Experienced" field in the IP header. When the buffer level difference between the posted descriptors versus the processed descriptors go beyond the configured range, the NIC unmarks the flow index so that the Congestion Experienced field is removed from the IP header. Thus, the NIC automatically throttles the TCP flows at both the transmit side and receive side for every flow.

There is a limitation on the number of simultaneous flows that can be supported at any given time based on the number of buffers available for a given QoS, number of flow table entries available and number of NPUs available to do the processing without incurring additional latency. TCP flows in a typical cloud environment are fairly latency sensitive, thus, the number of flows supported for ECN is determined considering all these aspects without incurring new latency.

This method can be applied to tunneled traffic as well by parsing and stripping the encapsulation headers from the incoming traffic and deducing inner TCP workflows. The encapsulation and de-capsulation works outside the inner TCP flow, and hence, it is hidden from the actual workflow.

Datacenters have diverse characteristics of the traffic. For example, for smaller data flows, ultra-low latency is expected, whereas for larger flows, higher throughput is expected. In these cases, isolation of the traffic is needed.

The following describes ECN, Data Center Quantized Congestion Notification (DCQCN) congestion detection and management techniques in smart NICs. A NIC can support ECN and DCQCN congestion detection and avoidance algorithms using packet parsers, packet processors and different scheduling algorithms as described below.

Firmware in the smart NIC sets rules to parse the IP packet and decode the IP header byte that carries the ECN data. The entries are set for overlay traffic IP header detection after stripping of outer headers for protocols such as GENEVE, Network Virtualization using Generic Routing Encapsulation (NVGRE) and Virtual Extensible Local Area Networking (VXLAN).

Figure 3:
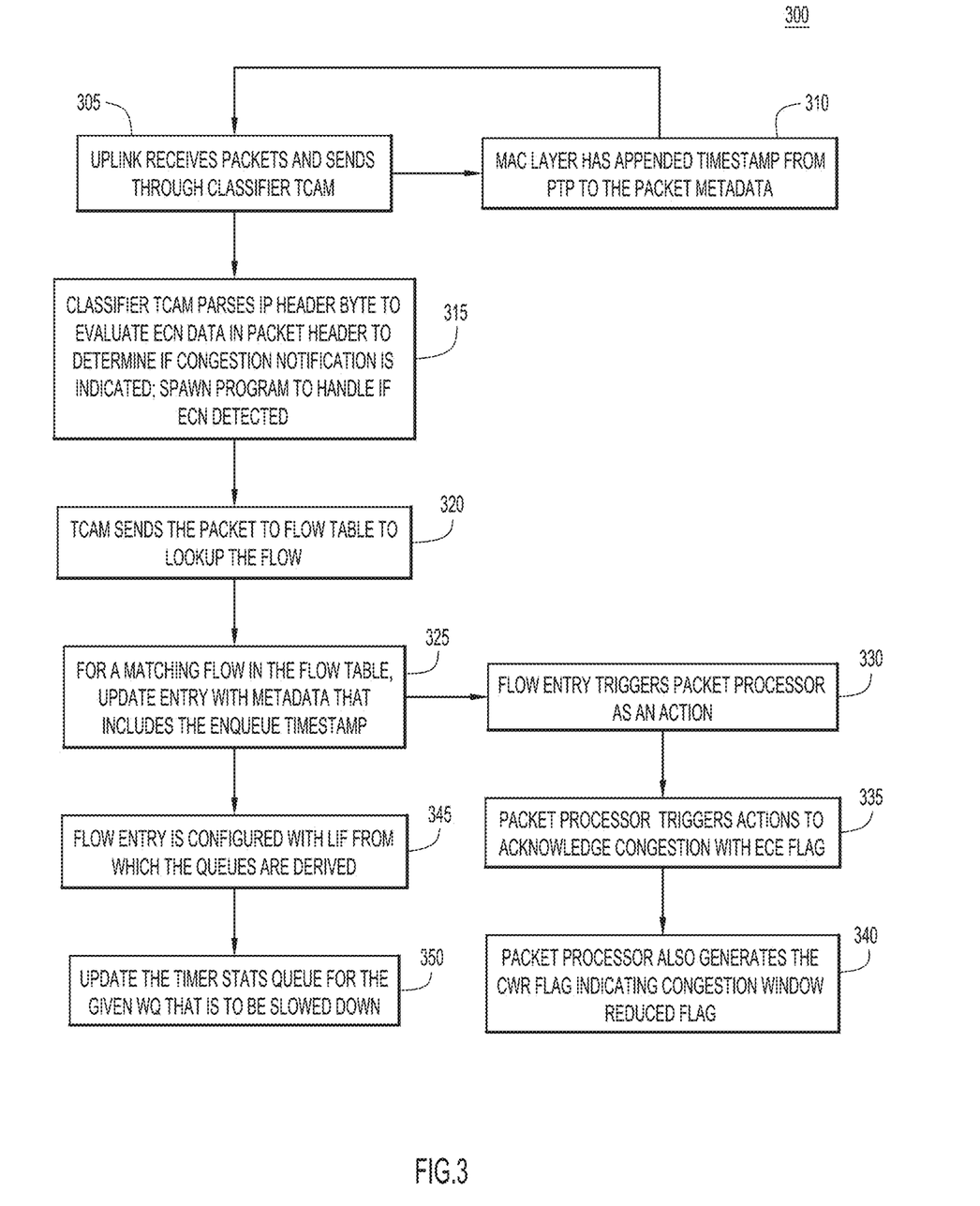
FIG. 3 is a flow chart depicting operations of a process performed by the network interface card to detect and process a congestion notification included in a packet received from a peer, according to an example embodiment.

Reference is now made to FIG. 3, with continued reference to FIG. 2, for description of a process performed by the smart NIC for packets received by the smart NIC from a peer to a host of the smart NIC. At 305, a packet is received at an uplink port and is sent through the classifier TCAM 208. At 310, the packet is marked with a timestamp when it is enqueued at the Media Access Control (MAC) layer since the MAC layer supports a timing protocol, such as the IEEE Precision Time Protocol (PTP). The enqueue timestamp is stored in the metadata associated with the packet.

At 315, the classifier TCAM parses the IP header byte of the packet where the ECN data may be included in order to detect that the Congestion Experienced bit fields are set in the packet. When a congestion notification is indicated in the packet, the classifier TCAM 208 spawns a program of the ingress packet processor 204 to handle the ECN. This program decodes the packet metadata and the timestamp associated with the congestion experienced flow.

At 320, the classifier TCAM 308 sends the packet to the flow table 210 to determine if there is an entry in the flow table that matches that packet. At 325, when there is a match in the flow table, the flow table entry is updated with metadata that includes the enqueue timestamp from operation 310. In so doing, the flow is tagged with timestamp and it is determined to which queue it belongs.

After operation 325, several further operations are performed, not necessarily in any particular order, and some of these operations may be performed in parallel. At 330, the flow entry triggers packet processor as an action. In other words, when the classifier is hit (detects a congestion notification), a flow table lookup will be performed based on the tuple configuration and to find the corresponding flow entry. The flow entry is pre-configured with the action as a packet processor program invocation. This is how the packet processor starts executing a preconfigured program.

At 335, the ingress packet processor 204 sends an ECE flag to acknowledge to the peer the congestion notification contained in the packet. At 340, the ingress packet processor sends the CWR flag indicating that the congestion window is being managed.

At 345, the flow entry (in the flow table) is configured with the logical interface (LIF) from which the queues are derived for that flow. At 350, the timer stats queue (of timer stats queues 214) is updated for the given WQ that is to be slowed down.

Figure 4:
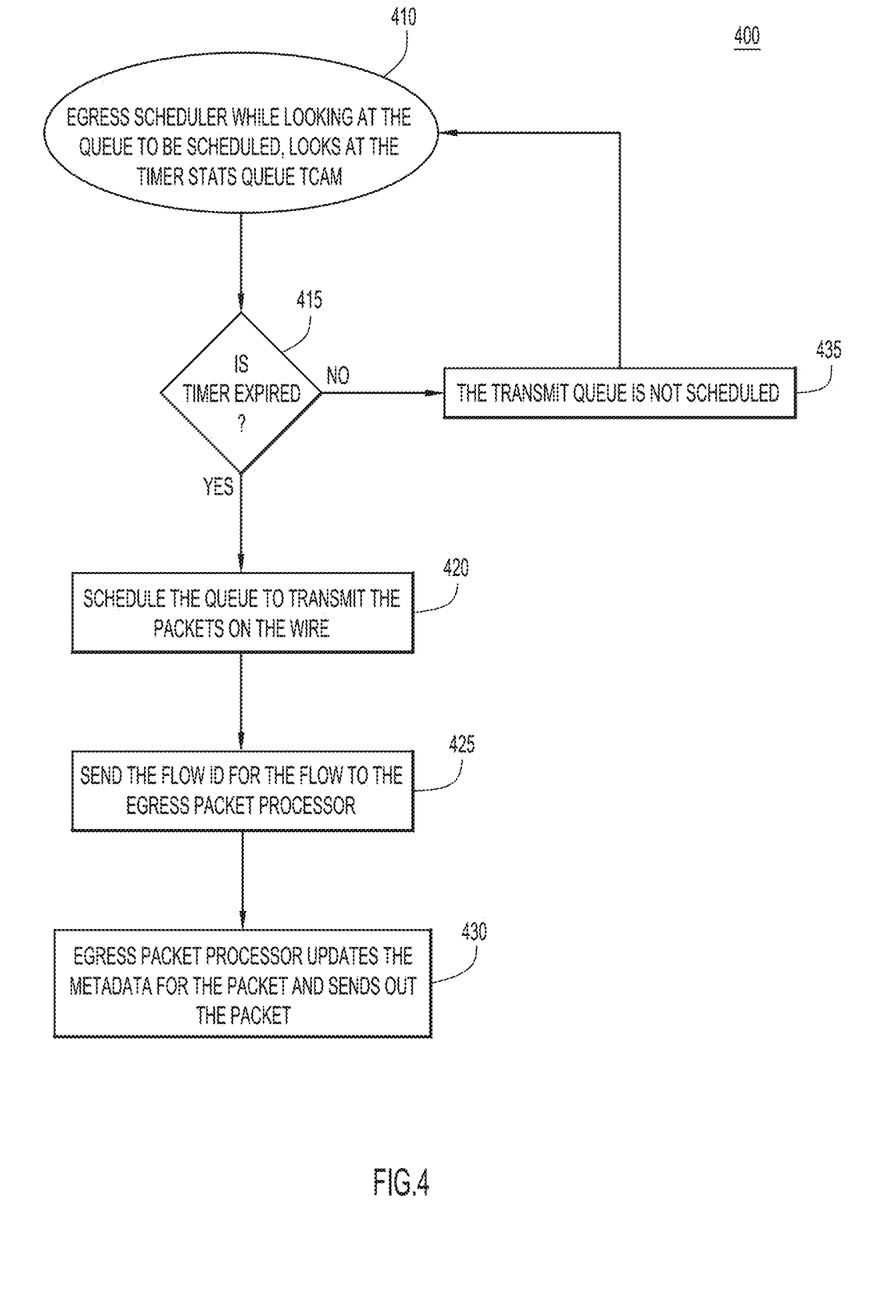
FIG. 4 is a flow chart depicting operations of a process performed by the network interface card to manage transmission of packets to a peer from which a congestion notification has been received for a packet flow, according to an example embodiment.

Reference is now made to FIG. 4, with continued reference to FIG. 2, a process 400 is described by which packets are scheduled for egress by the smart NIC. As explained above, a timer is set to schedule the next packet, provided by the host to the smart NIC, to be transmitted to the peer for a given flow. At 410, the egress scheduler 212 evaluates the timer stats queue TCAM 214 for the queue to be scheduled for egress processing. Even though the application driver of the host may post a packet to be sent for the flow, the packet will not be scheduled until the timer expires. At 415, it is determined whether the timer has expired. Once the timer expires, at 420, the egress scheduler 212 schedules the queue to transmit packets for the flow via the egress packet processor 206. At 425, the egress scheduler 212 marks the flow as eligible for sending and sends the flow ID to the egress packet processor 206 to transmit the next packet for the flow. At 430, the egress scheduler processor 212 processes the packet descriptors posted by the driver for the given flow, updates the packet with the relevant metadata and sends out the packet. If, at 415, the egress scheduler 212 determines that the timer has not expired, then at 435, the transmit queue is not scheduled for transmission and the process 400 returns to 410.

Time-based congestion management is deterministic compared to buffer-based congestion handling. Thus, the smart NIC avoids/handles the congestion without notifying the host networking stack about the congestion. When the received packet (at 305) is sent to the host, the smart NIC records the dequeue packet timestamp. The scheduling is done based on the dequeue timestamp and the enqueue packet timestamps to achieve better flexibility in the scheduling of the workload for the given flow. When a packet is posted by the Ethernet MAC processor, an enqueue timestamp (such as in terms of the IEEE 1588 PTP) is added, as described above. The enqueue timestamp is carried forwarded with the packet. When the packet is processed using the procedure described above and posted to the host (called dequeuing), the packet processor can register the timestamp when (dequeue timestamp) it is posted to the host defined buffer in host system memory.

Figure 5:
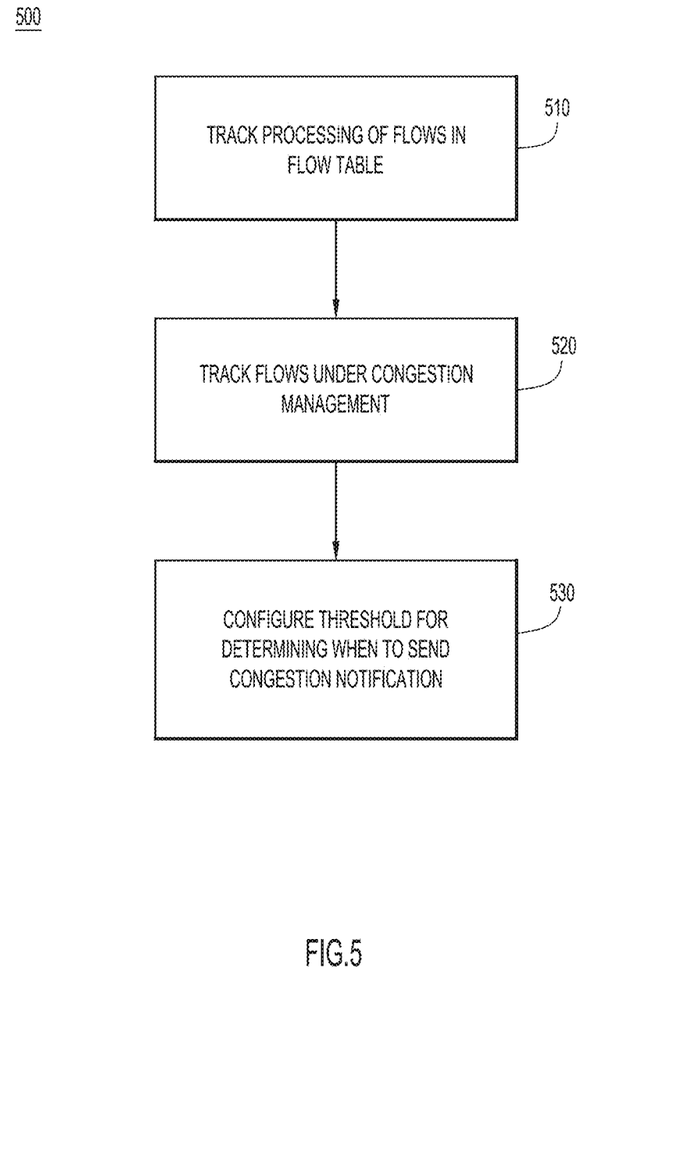
FIG. 5 is a flow chart depicting operations of a process for determining when to configure a threshold used to determine when to send a congestion notification to a peer, according to an example embodiment.

Reference is now made to FIG. 5, with continued reference to FIGS. 2-4. FIG. 5 illustrates a flow chart for a process 500 performed by the smart NIC to detect a situation when a host is processing packets slower than the rate at which a peer is sending packets. At 510, the NIC keeps track of flows in the flow table 212. At 520, the NIC keeps track of the descriptor processing for a flow that has been marked to be tracked for congestion management. At 530, the firmware of the NIC (e.g., the egress scheduler 212) configures a threshold for determining when to send a congestion notification. For example, the threshold may be for a difference between a posted index and a fetch index for a given queue and for a given flow. This difference is reflective of the rate at which the host is processing incoming packets received by the NIC.

Figure 6:
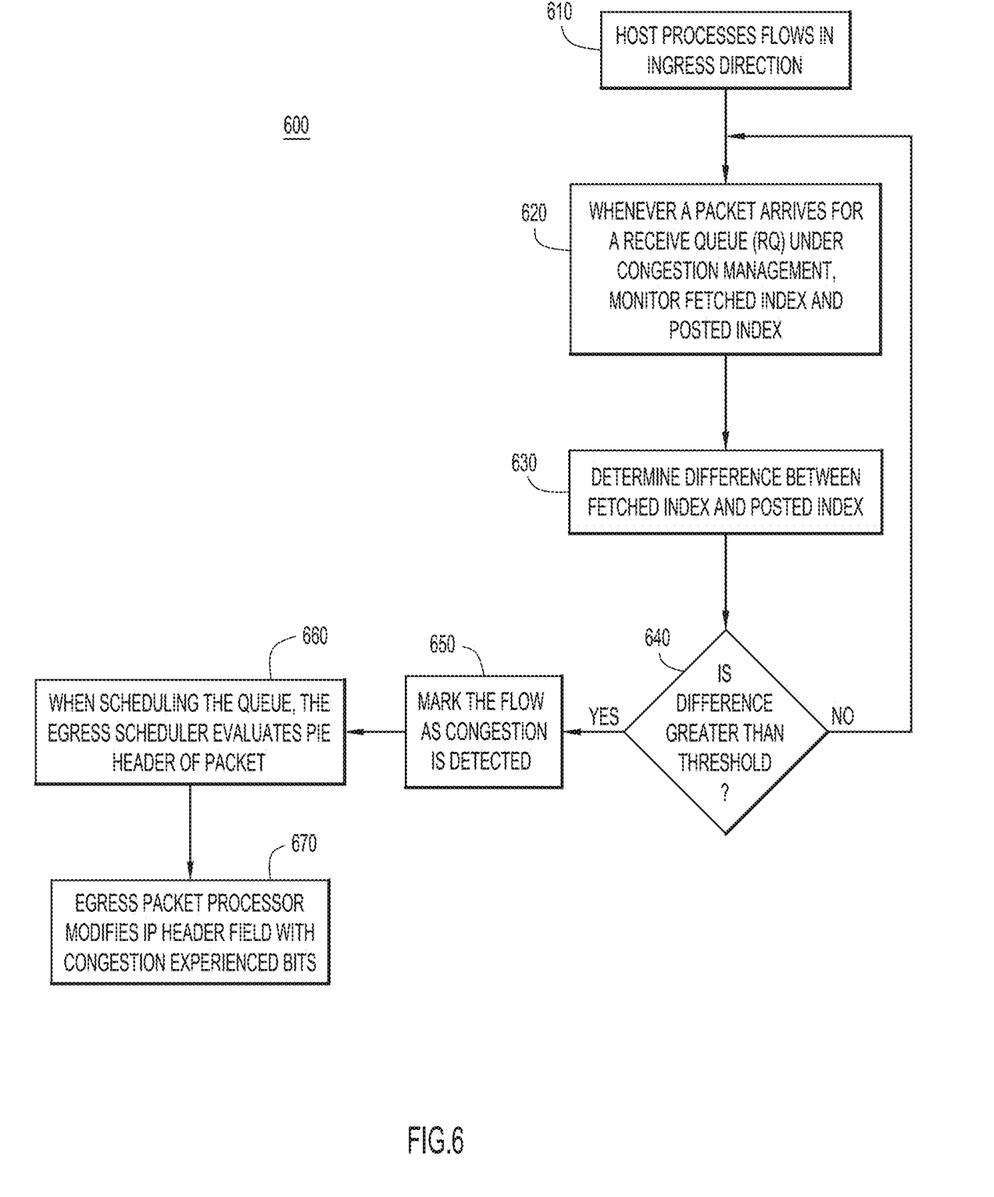
FIG. 6 is a flow chart depicting operations of a process for determining when to include a congestion notification to a peer for a packet flow, according to an example embodiment.

Turning now to FIG. 6, with continued reference to FIGS. 1-5, a process 600 is now described by which the smart NIC manages the situation when the host is processing packets slower than the rate of incoming packets sent by a peer. At 610, the host processes flows in the ingress direction. At 620, when a packet arrives for a receive queue (RQ) under congestion management (through the monitoring performed at operation 520 in FIG. 5), the fetched index (used by the host to read a processed ingress packet from memory) and the posted index (the index to which the NIC posts the processed ingress packet) are determined. At 630, the difference between the fetched index and the posted index is computed. Again, this difference indicates the rate at which the host is processing incoming packets received by the NIC.

At operation 640, the NIC compares this difference with the threshold configured at operation 530 in FIG. 5. When the difference is greater than the threshold, then at 650, the flow is marked as congestion has been detected. Otherwise, processing reverts back to operation 620. After a flow has been marked at 650, then at 660, when scheduling the queue, the egress scheduler 212 evaluates the Proportional Integral controller Enhanced (PIE) header of the packet. The PIE header includes the congestion detection metadata field. At 670, the egress packet processor 206 modifies IP header field with Congestion Experienced bits of the ECN byte, so that the flow of packets back to the peer will include an indication to the NIC of the peer that the host is experiencing congestion, and thereby alerting the peer to slow down its rate of incoming packets.

DCQCN is based on RFC 3168 and makes use of the ECN notification reported by the nodes in the packet switching path. The difference in DCQCN handling compared to the ECN management described above is the processing of the congestion notification messages (CNP) as an extra step in order to notify the peer to reduce the transmission speed at the Queue Pair (QP) level. This is handled only for a Remote Direct Memory Access (RDMA) workload. RDMA specifies a technique for moving buffers between two applications across a network. It differs from traditional network interfaces because it bypasses the operating system. RDMA communication is based on a set of three queues. The send queue and receive queue are responsible for scheduling work. They are created in pairs, and are referred to as a QP. A Completion Queue (CQ) is used to notify when the instructions placed on the work queues have been completed. The egress scheduler 212 isolates the QP associated with the congestion and marks it ineligible for scheduling.

Figure 7:
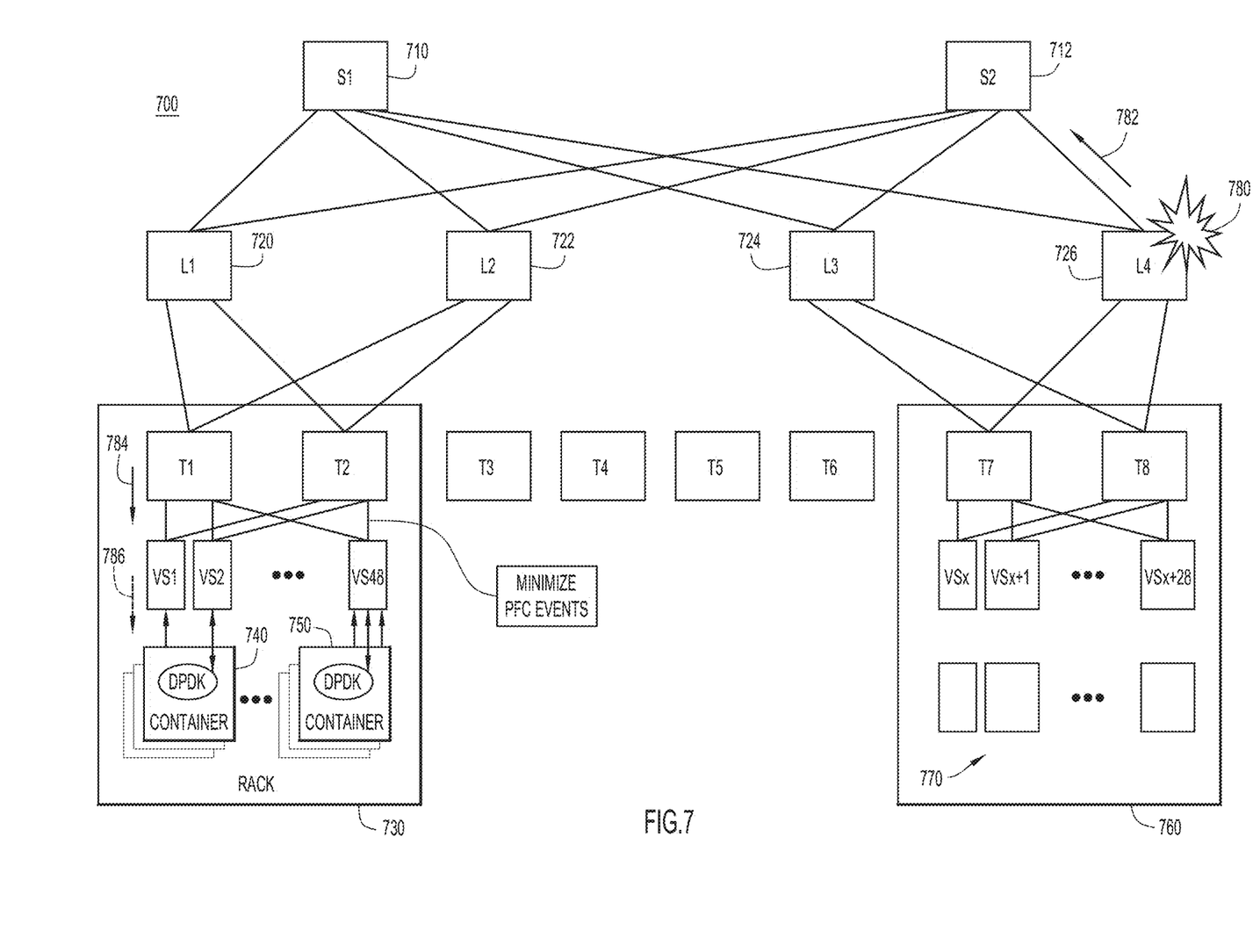
FIG. 7 is a diagram of a network environment in which congestion management techniques may be employed, according to an example embodiment.

FIG. 7 illustrates a spine-leaf fabric 700 in which a NIC slows down the rate at which data is transmitted into the network, using the techniques described above in connection with FIGS. 1-6. The spine-leaf fabric 700 includes spine switches S1 and S2 shown at reference numerals 710 and 712, and leaf switches L1, L2, L3 and L4, shown at reference numerals 720, 722, 724 and 726. There are also top-of-rack (ToR) switches T1-T8. The switches T1-T8 are connected to leaf switches as shown. In one example, ToR switches T1 and T2 are within a rack 730 that includes a plurality of virtual switches VS1-VS48, as well as a plurality of containers running in the rack. ToR switches T1 and T2 are connected to leaf switches L1 and L2. For example, a first plurality of containers 740 communicating through VS1 and a second plurality of containers 750 communicating through VS48, as an example. Similarly, there is a rack 760 that includes T7 and T8 that rare connected to leaf switches L3 and L4, and a plurality of virtual switches VS1-VS48 and a plurality of containers 770. The virtual switches in the racks 730 and 760 may be smart NICs or virtual switches/virtual routers.

In an example embodiment, a congestion event is detected at leaf switch L4 for a communication flow between a peer behind virtual switch VS1, as shown at 780. Leaf switch L4 sends a congestion message 782 which is eventually directed to ToR switch T1 at 784, which reaches NIC VS1. Using the techniques described above in connection with FIGS. 1-6, the hardware (or software of) NIC VS1 receives the congestion message and slows down the rate at which it transmits data into the network from the container that is the participating in the flow. Thus, as shown at 786, VS1 paces traffic coming from one of the plurality of containers 740. This can be useful to do for a period of time in order to push a head-of-line blocking back to the offending container that is sending traffic at too high of a rate into the network. VS1 will stop processing transmit descriptors from a particular container for a period of time.

Thus, according to the embodiment of FIG. 7, containers may map capability such that the offending flow would be able to throttle its own sending/transmission rate. From a control system perspective, this would guarantee stability is achieved. The software scheduler could be slow to respond or have queued a large amount of data in the transit descriptor so that the NIC hardware should be faster to respond.

Today, the latency for a given flow has become important to avoid the retransmission of the packets. The connection establishment after a packet drop or even simply the packet retransmission causes latency issues. Processing the ECN at the host side is non-productive work for the host. Applications will want to offload that work to a capable NIC so that the ECN management, and buffers adjustment do not need to be handled at the application or networking stack level. The situation worsens for tunneled traffic associated with virtual machines.

In such a scenario, the ECN offload to the network adapter device (NIC) for the scheduling of the TCP flow based on the ECN protocol is very useful. The NIC can implement the ECN (entirely in one or more ASICs) and smart NIC network processing units, such that a host stack does not need to handle any of ECN protocol. The NIC handles the ECN completely in one or more ASICs without exerting any overhead on the host stack and without wasting the host CPU resources In summary, in one form, a method performed by a network adapter device connected to a host is provided, the method comprising: receiving a packet sent over a network from a peer, the packet including an enqueue timestamp indicating when the packet has been enqueued at the network adapter device; parsing a header of the packet to detect whether the header includes bits indicating that the peer device is experiencing congestion; obtaining packet metadata of the packet and the enqueue timestamp of the packet; comparing the packet metadata with information in a flow table to identify an entry in the flow table corresponding to a flow to which the packet metadata matches; setting a timer associated with the flow, the timer for use in scheduling transmission of a next packet provided by the host to be sent to the peer; and upon expiration of the timer, triggering a function of the network adapter device to manage transmission of the next packet for the flow by the network adapter device.

In one embodiment, the method may further include the function passing an identifier associated with the flow to an egress packet processor of the network adapter device, and the egress packet processor marks the flow as eligible for scheduling and processes descriptors posted by a host driver for the flow so as to cause transmission of the next packet without notifying the host about the congestion.

The method may further include recording a dequeue timestamp when the packet that is received from the peer is provided to the host. The duration of the timer may be based on the enqueue timestamp and the dequeue timestamp according to a time-based congestion window algorithm.

In one embodiment, until expiration of the timer, the flow may be marked in the flow table as ineligible for scheduling if the host posts work for that flow to the network adapter device.

The method may further include determining when to set congestion notification bits in a header of a packet to be sent to the peer device to indicate that the host is experiencing slowness in processing received packets. Moreover, the determining operation may include: monitoring a difference between a posted index of a packet to memory by the network adapter device and a fetch index of the packet by the host; and comparing the difference with a threshold to determine whether a rate at which the host is draining packets from the network adapter device is less than a rate of incoming packets from the peer. In one embodiment, the threshold may be dependent on a number of buffers for a quality of service associated with the flow and how many flows have the same quality of service.

The method may still further include: marking the flow with a congestion notification when the difference is greater than the threshold; and unmarking the flow with the congestion notification when the difference is less than the threshold to thereby remove the congestion notification bits from packets for the flow to be sent to the peer.

As described above in connection with FIG. 7, the trigger operation may include triggering an egress scheduler of the network adapter device to slow down a rate that packets are transmitted from the network adapter device into a network. The packet may further include rate information to indicate how to slow down the rate that packets are transmitted from the network adapter device into the network. The method may still further include deferring processing of packets from a container running on the host to pace traffic coming from the container.

In still another form, an apparatus is provided comprising: a plurality of ports at which packets communicated over a network are received and from which packets are sent into the network; and at least one application specific integrated circuits (ASIC) coupled to the plurality of ports, the ASIC implementing an egress packet processor, an ingress packet processor, a flow table, a classifier ternary content-addressable memory (TCAM), a timer statistics TCAM to store time statistics for queues maintained by the ASIC and egress scheduler, wherein the ASIC is configured to obtain, via one of the plurality of ports, a packet sent over the network from a peer, the packet including an enqueue timestamp indicating when the packet has been enqueued at the ASIC; wherein the classifier TCAM is configured to: parse a header of the packet to detect whether the header includes bits indicating that the peer device is experiencing congestion; obtain packet metadata of the packet and the enqueue timestamp of the packet; and compare the packet metadata with information in the flow table to identify an entry in the flow table corresponding to a flow to which the packet metadata matches; wherein the egress scheduler sets a timer associated with the flow for use in scheduling transmission of a next packet provided by the host to be sent to the peer such that upon expiration of the timer, a function is triggered to manage transmission of the next packet for the flow by the ASIC.

As described above, the function may pass an identifier associated with the flow to the egress packet processor, wherein the egress packet processor marks the flow as eligible for scheduling and processes descriptors posted by a host driver for the flow so as to cause transmission of the next packet without notifying the host about the congestion.

Further, the timer statistics TCAM may be configured to record a dequeue timestamp when the packet that is received from the peer is provided to the host. The duration of the timer is based on the enqueue timestamp and the dequeue timestamp according to a time-based congestion window algorithm. Moreover, the egress scheduler may, until expiration of the timer, mark the flow in the flow table as ineligible for scheduling if the host posts work for that flow.

In still another form, a method performed by a network adapter device connected to a host is provided, the method comprising: receiving a packet sent over a network from a peer, the packet including an enqueue timestamp indicating when the packet has been enqueued at the network adapter device; parsing a header of the packet to detect whether the header includes bits indicating that the peer device is experiencing congestion; obtaining packet metadata of the packet and the enqueue timestamp of the packet; comparing the packet metadata with information in a flow table to identify an entry in the flow table corresponding to a flow to which the packet metadata matches; recording a dequeue timestamp when the packet that is received from the peer is provided to the host; setting a timer associated with the flow, the timer for use in scheduling transmission of a next packet provided by the host to be sent to the peer, wherein a duration of the timer is based on the enqueue timestamp and the dequeue timestamp according to a time-based congestion window algorithm; and upon expiration of the timer, triggering a function of the network adapter device to pass an identifier associated with the flow to an egress packet processor of the network adapter device, wherein the egress packet processor marks the flow as eligible for scheduling and processes descriptors posted by a host driver for the flow so as to cause transmission of the next packet without notifying the host about the congestion.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method performed by a network adapter device connected to a host, the method comprising:
   receiving a packet sent over a network from a peer device, the packet including an enqueue timestamp indicating when the packet has been enqueued at the network adapter device;
   parsing a header of the packet to detect whether the header includes bits indicating that the peer device is experiencing congestion;
   obtaining packet metadata of the packet and the enqueue timestamp of the packet;
   comparing the packet metadata with information in a flow table to identify an entry in the flow table corresponding to a flow to which the packet metadata matches;
   recording a dequeue timestamp when the packet that is received from the peer device is provided to the host, setting a timer associated with the flow based on the enqueue timestamp and the dequeue timestamp, the timer for use in scheduling transmission of a next packet provided by the host to be sent to the peer device; and upon expiration of the timer, triggering a function of the network adapter device to manage transmission of the next packet for the flow by the network adapter device.

2. The method of claim 1, further comprising the function passing an identifier associated with the flow to an egress packet processor of the network adapter device, wherein the egress packet processor marks the flow as eligible for scheduling and processes descriptors posted by a host driver for the flow so as to cause transmission of the next packet without notifying the host about the congestion.

3. The method of claim 1, wherein a duration of the timer is based on the enqueue timestamp and the dequeue timestamp according to a time-based congestion window algorithm.

4. The method of claim 1, further comprising:
until expiration of the timer, marking the flow in the flow table as ineligible for scheduling if the host posts work for the flow to the network adapter device.

5. The method of claim 1, further comprising:
determining when to set congestion notification bits in a header of a packet to be sent to the peer device to indicate that the host is experiencing slowness in processing received packets.

6. The method of claim 5, wherein determining comprises:
monitoring a difference between a posted index of a packet to memory by the network adapter device and a fetch index of the packet by the host; and
comparing the difference with a threshold to determine whether a rate at which the host is draining packets from the network adapter device is less than a rate of incoming packets from the peer device.

7. The method of claim 6, wherein the threshold is dependent on a number of buffers for a quality of service associated with the flow and how many flows have the same quality of service.

8. The method of claim 7, further comprising:
marking the flow with a congestion notification when the difference is greater than the threshold; and
unmarking the flow with the congestion notification when the difference is less than the threshold to thereby remove the congestion notification bits from packets for the flow to be sent to the peer device.

9. The method of claim 1, wherein triggering comprises triggering an egress scheduler of the network adapter device to slow down a rate that packets are transmitted from the network adapter device into the network.

10. The method of claim 9, wherein the packet further includes rate information to indicate how to slow down the rate that packets are transmitted from the network adapter device into the network.

11. The method of claim 9, further comprising deferring processing of packets from a container running on the host to pace traffic coming from the container.

12. An apparatus comprising:
a plurality of ports at which packets communicated over a network are received and from which packets are sent into the network; and
at least one application specific integrated circuits (ASIC) coupled to the plurality of ports, the ASIC implementing an egress packet processor, an ingress packet processor, a flow table, a classifier ternary content-addressable memory (TCAM), a timer statistics TCAM to store time statistics for queues maintained by the ASIC and egress scheduler, wherein the ASIC is configured to obtain, via one of the plurality of ports, a packet sent over the network from a peer device, the packet including an enqueue timestamp indicating when the packet has been enqueued at the ASIC;

wherein the classifier TCAM is configured to:
parse a header of the packet to detect whether the header includes bits indicating that the peer device is experiencing congestion;
obtain packet metadata of the packet and the enqueue timestamp of the packet; and
compare the packet metadata with information in the flow table to identify an entry in the flow table corresponding to a flow to which the packet metadata matches; and
record a dequeue timestamp when the packet that is received from the peer device is provided to a host,
wherein the egress scheduler sets a timer associated with the flow based on the enqueue timestamp and the dequeue timestamp, the timer for use in scheduling transmission of a next packet provided by the host to be sent to the peer device such that upon expiration of the timer, a function is triggered to manage transmission of the next packet for the flow by the ASIC.

13. The apparatus of claim 12, wherein the function passes an identifier associated with the flow to the egress packet processor, wherein the egress packet processor marks the flow as eligible for scheduling and processes descriptors posted by a host driver for the flow so as to cause transmission of the next packet without notifying the host about the congestion.

14. The apparatus of claim 12, wherein a duration of the timer is based on the enqueue timestamp and the dequeue timestamp according to a time-based congestion window algorithm.

15. The apparatus of claim 12, wherein the egress scheduler, until expiration of the timer, marks the flow in the flow table as ineligible for scheduling if the host posts work for the flow.

16. The apparatus of claim 12, wherein the function is triggering the egress scheduler to slow down a rate that packets are transmitted from the apparatus into the network.

17. The apparatus of claim 12, wherein the ASIC is further configured to defer processing of packets from a container running on the host to pace traffic coming from the container.

18. A method performed by a network adapter device connected to a host, the method comprising:
receiving a packet sent over a network from a peer device, the packet including an enqueue timestamp indicating when the packet has been enqueued at the network adapter device;
parsing a header of the packet to detect whether the header includes bits indicating that the peer device is experiencing congestion;
obtaining packet metadata of the packet and the enqueue timestamp of the packet;
comparing the packet metadata with information in a flow table to identify an entry in the flow table corresponding to a flow to which the packet metadata matches;
recording a dequeue timestamp when the packet that is received from the peer device is provided to the host;
setting a timer associated with the flow, the timer for use in scheduling transmission of a next packet provided by the host to be sent to the peer device, wherein a duration of the timer is based on the enqueue timestamp and the dequeue timestamp according to a time-based congestion window algorithm; and upon expiration of the timer, triggering a function of the network adapter device to pass an identifier associated with the flow to an egress packet processor of the network adapter device, wherein the egress packet processor marks the flow as eligible for scheduling and processes descriptors posted by a host driver for the flow so as to cause transmission of the next packet without notifying the host about the congestion.

19. The method of claim 18, further comprising:

until expiration of the timer, marking the flow in the flow table as ineligible for scheduling if the host posts work for the flow to the network adapter device.

20. The method of claim 18, wherein triggering comprises triggering an egress scheduler of the network adapter device to slow down a rate that packets are transmitted from the network adapter device into the network.

* * * * *

UNITED STATES PATENT AND TRADEMARK OFFICE
CERTIFICATE OF CORRECTION

PATENT NO. : 10,785,161 B2
APPLICATION NO. : 16/031127
DATED : September 22, 2020
INVENTOR(S) : Sagar Borikar et al.

Page 1 of 1

It is certified that error appears in the above-identified patent and that said Letters Patent is hereby corrected as shown below:

In the Claims

Claim 1, Column 12, Line 67, please replace "the host," with --the host;--

Signed and Sealed this
Seventh Day of December, 2021

Drew Hirshfeld
*Performing the Functions and Duties of the
Under Secretary of Commerce for Intellectual Property and
Director of the United States Patent and Trademark Office*